United States Patent
Simmons (10) Patent No.: US 7,416,577 B2
(45) Date of Patent: Aug. 26, 2008

(54) AIR INTAKE FILTER SCREEN ASSEMBLY INCLUDING A STAND-OFF FRAME FOR PREVENTING HAIL DAMAGE TO SURFACE COILS OF AN ASSOCIATED AIR INTAKE UNIT

(76) Inventor: Randy Simmons, 5924 Owl Nest Dr., West Chester, OH (US) 45069

( * ) Notice: Subject to any disclaimer, the term of this patent is extended or adjusted under 35 U.S.C. 154(b) by 483 days.

(21) Appl. No.: 11/126,561

(22) Filed: May 11, 2005

(65) Prior Publication Data

US 2005/0279065 A1    Dec. 22, 2005

Related U.S. Application Data

(63) Continuation-in-part of application No. 10/870,608, filed on Jun. 17, 2004, and a continuation-in-part of application No. 11/023,195, filed on Dec. 27, 2004.

(51) Int. Cl.
*B01D 46/00* (2006.01)
(52) U.S. Cl. ............................... 55/495; 55/491; 55/502; 55/506; 55/524; 55/528; 55/DIG. 31
(58) Field of Classification Search .................. 55/351, 55/354, 418, 478, 481, 490, 491, 492, 495, 55/501, 502, 503, 506, 524, 528, DIG. 31
See application file for complete search history.

(56) References Cited

U.S. PATENT DOCUMENTS

| | | | |
|---|---|---|---|
| 3,950,157 A * | 4/1976 | Matney | 55/501 |
| 3,999,969 A * | 12/1976 | Shuler | 55/DIG. 31 |
| 4,288,992 A | 9/1981 | Eliason | 62/256 |
| 4,684,381 A * | 8/1987 | Wasylyniuk | 55/502 |
| 5,266,090 A | 11/1993 | Burnett | 55/333 |
| 5,370,722 A | 12/1994 | Simmons | 55/351 |
| 5,421,862 A * | 6/1995 | Davis | 55/491 |
| 5,525,145 A | 6/1996 | Hodge | 96/17 |
| 5,529,593 A | 6/1996 | Simmons | 55/354 |
| D402,356 S | 12/1998 | Hodge | D23/365 |
| 5,873,999 A * | 2/1999 | Gaiser | 55/524 |
| 5,904,744 A | 5/1999 | Kagan | 55/385.1 |
| 5,935,282 A * | 8/1999 | Lin | 55/501 |

(Continued)

*Primary Examiner*—Jason M Greene
(74) *Attorney, Agent, or Firm*—Gifford, Krass, Sprinkle, Anderson & Citkowski, P.C.

(57) ABSTRACT

A filter screen assembly for use with an air intake structure, the structure including a face within which is formed an air intake opening. The filter screen assembly includes a screen having a flexible mesh material and an outer perimeter edge. A three-dimensional component, including such as a multi-sided frame or a plurality of spacer collars, are secured to the face of the intake structure surrounding the opening. The screen is secured about locations associated with its outer perimeter to the face of the air intake structure to space the screen from a surface of the air intake structure and in order to filter out contaminants associated with an air stream entering the intake structure. Spacing the screen also prevents objects impacting the screen from damaging such as the surface coils associated with the air intake opening.

16 Claims, 5 Drawing Sheets

U.S. PATENT DOCUMENTS

| | | | |
|---|---|---|---|
| 6,174,340 B1 | 1/2001 | Hodge | 55/385.1 |
| 6,197,077 B1 * | 3/2001 | Simmons et al. | 55/491 |
| 6,279,335 B1 | 8/2001 | Jacobs | 62/249 |
| 6,361,578 B1 * | 3/2002 | Rubinson | 55/501 |
| 6,527,838 B2 | 3/2003 | Volo et al. | 96/134 |
| 6,699,301 B1 * | 3/2004 | Eisenhauer | 55/501 |
| 6,918,940 B1 * | 7/2005 | Lackey et al. | 55/501 |
| 2003/0070769 A1 | 4/2003 | Lampers | 160/113 |

* cited by examiner

AIR INTAKE FILTER SCREEN ASSEMBLY INCLUDING A STAND-OFF FRAME FOR PREVENTING HAIL DAMAGE TO SURFACE COILS OF AN ASSOCIATED AIR INTAKE UNIT

CROSS REFERENCE TO RELATED APPLICATIONS

The present application is a continuation in part of U.S. application Ser. No. 10/870,608, filed Jun. 17, 2004, entitled "Air Intake Filter Screen Assembly," as well as a continuation-in-part of U.S. application Ser. No. 11/023,195, filed Dec. 27, 2004, for an "Air Intake Filter Screen Assembly."

BACKGROUND OF THE INVENTION

1. Field of the Invention

The invention relates generally to filter screen assemblies for use with such as large sized air intake/handling units. More specifically, the present invention teaches the incorporation of a stand-off structure, such as a perimeter extending stand-off frame or perimeter secured spacing collars, in either instance spacing a filter mesh media away from a surface of an air intake structure, in order to prevent the incidence of hail damage to surface coils associated with the structure. Spacing of the filter mesh from adhering contact with the air intake coils further allows its heavy duty and vinyl coated polyester medium to function in a drum-like manner to absorb and deflect the forces associated with the hail or other foreign objects impacting the filter at varying angles and without damaging the underlying surface structure associated with the air handling unit.

2. Description of the Prior Art

The prior art is well documented with examples of filter assemblies, and in particular those in use with air intake structures. The objective in such instances is to provide an effective screen covering for a structural air intake, and such as in particular a cooling tower or other similar industrial based structure.

A first example drawn from the prior art is disclosed in U.S. Pat. No. 5,370,722, issued to Simmons, which teaches a filtering assembly for protecting an air intake of a structure and including a flexible screen mounted so as to cover the air intake. The screen is selectively moved in either of opposite directions, such as through application of first and second pulley assemblies located on opposite sides of the screen which are engaged by pull ropes to raise and lower the screen. A container is located at a base of the structure, beneath the intake opening, and stores the flexible screen when not in use.

In a second preferred embodiment, first and second containers are secured to the structure at locations above and below the intake opening. The flexible screen is formed as first and second interconnected and cylindrical rolls placeable within the containers and operable by a crank to advance an intermediate, unrolled and interconnected portion of the screen across the intake opening.

A further example of the prior art is disclosed in U.S. Pat. No. 6,197,077, also issued to Simmons, and disclosing a filter screen assembly mounted over an air intake structure having a height, width and depth and which defines a selected face within which the air intake opening is formed. A planar and flexible filtration screen defines a substantially rectangular shape with top, bottom and first and second side edges. Fasteners are provided for securing the sides of the screen to corresponding sides of the intake structure and include eyelets formed within the screen which are supported upon tubular portions extending from the structure and fasteners which secure within the tubular portions to affix the screen in place.

In a preferred embodiment, a stiffening and engaging bar associated with a top edge of the flexible screen includes upwardly extending hooks 36 and 38 which are secured upon an engaging bar mounted in extending fashion along a top edge of the structure. A side extending engagement of the screen is facilitated by collars secured to the edges of the air intake structure and to which eyelets formed along the screen edges are aligned and secured thereover through the further addition of screws or the like.

U.S. Pat. No. 6,279,335, issued to Jacobs, teaches a refrigerated case cover having a cover sheet constructed of an insulating material and having air cells sandwiched between an outer cover sheet and an inner cover sheet. Eyelets are disposed along the top and bottom edges of the cover and a cord is woven through the lower eyelets. A male tab is disposed on each cover sheet side and the cover is attached to a refrigerated case by attaching the upper eyelets to an upper case front lip by means of S hooks, and attaching the cord to grille spokes disposed along a lower case front upper edge with S hooks, and by attaching each cover sheet side to a respective case side with hook-and-loop material. In an alternate embodiment, a refrigerated case cover has weights disposed along the cover sheet lower edge in order to keep the refrigerated case cover sealed against a refrigerated case lower front, and to expedite installation and removal of the refrigerated case cover.

SUMMARY OF THE PRESENT INVENTION

The present invention is a filter screen assembly for use with an air intake structure, such as typically a cooling tower, HVAC structure or the like. In particular, the present invention discloses a stand-off structure, such as a perimeter extending stand-off frame or perimeter secured spacing collars, in either instance spacing a filter mesh media away from a surface of an air intake structure, in order to prevent the incidence of hail damage to surface coils associated with the structure.

The filter screen or netting assembly is intended to be quick and easy to install and specifically reduces the amount of work required for installation and removal as needed. The heavy duty construction of the filter mesh screening is further such that, when stretched taut over the intake opening in spaced-apart fashion, the screen effectively absorbs and deflects impact forces associated with hail and other articles.

In each of the preferred embodiments, a screen is constructed of a mesh (typically flexible) material and including an outer perimeter edge. The perimeter edge is secured in a spaced fashion to the face of the air intake structure, such as to filter out contaminants associated with an air stream entering the intake structure and to prevent the screen from being drawn into the air intake opening. The air intake structure, such as including air handling units, chillers, condenser units and the like, includes surface extending HVAC coils which may suffer from hail damage.

In a first application, a rectangular shaped stand-off frame is provided, to which the filter screen is secured, and which in turn is secured to the face of the air intake structure. The filter screen may include an outer reinforced perimeter including grommets for receiving through bolts in order for securing to an exterior facing surface of the stand-off frame. Alternatively, the grommets may be formed directly into outer edge locations of the filter screen and such that there is no distinct perimeter edge about the filter screen.

The spacer frame, when viewed in cross section, can adopt either a "U" or a modified "S" shaped configuration and can further employ either one or two individual pluralities of mounting bolts for securing together the filter screen, stand-off frame and surrounding perimeter surface of the air intake unit. In a further variant, sleeve shaped spacer collars can be used in place of the stand-off frame, the filter screen securing directly to extending locations of the collars and being further dimensioned to overlay and engage the top, side and bottom angled surfaces of the intake unit, thereby increasing the effective filtration surface area in addition to providing an enhanced degree of hail protection.

In each of the embodiments, a number of apertures are formed at locations along the perimeter edge of the filter screen and through which are engaged other fasteners (e.g., screws, bolts, snaps, hooks, stud adapters, button mechanisms and the like) in order to provide additional engagement of the filter screen to the air intake face and to again prevent the screen from being drawn into the intake opening in use. In a further embodiment, the perimeter extending mounting fasteners may provide the sole means for securing the perimeter edge to the face of the air intake structure and, in a yet further application, it is envisioned that the fasteners and mounting apertures can be substituted by hook-and-loop fasteners established between the inner facing surface of the perimeter edge and an outer facing surface of the air intake face and in order to reasonably secure the filter screen assembly.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
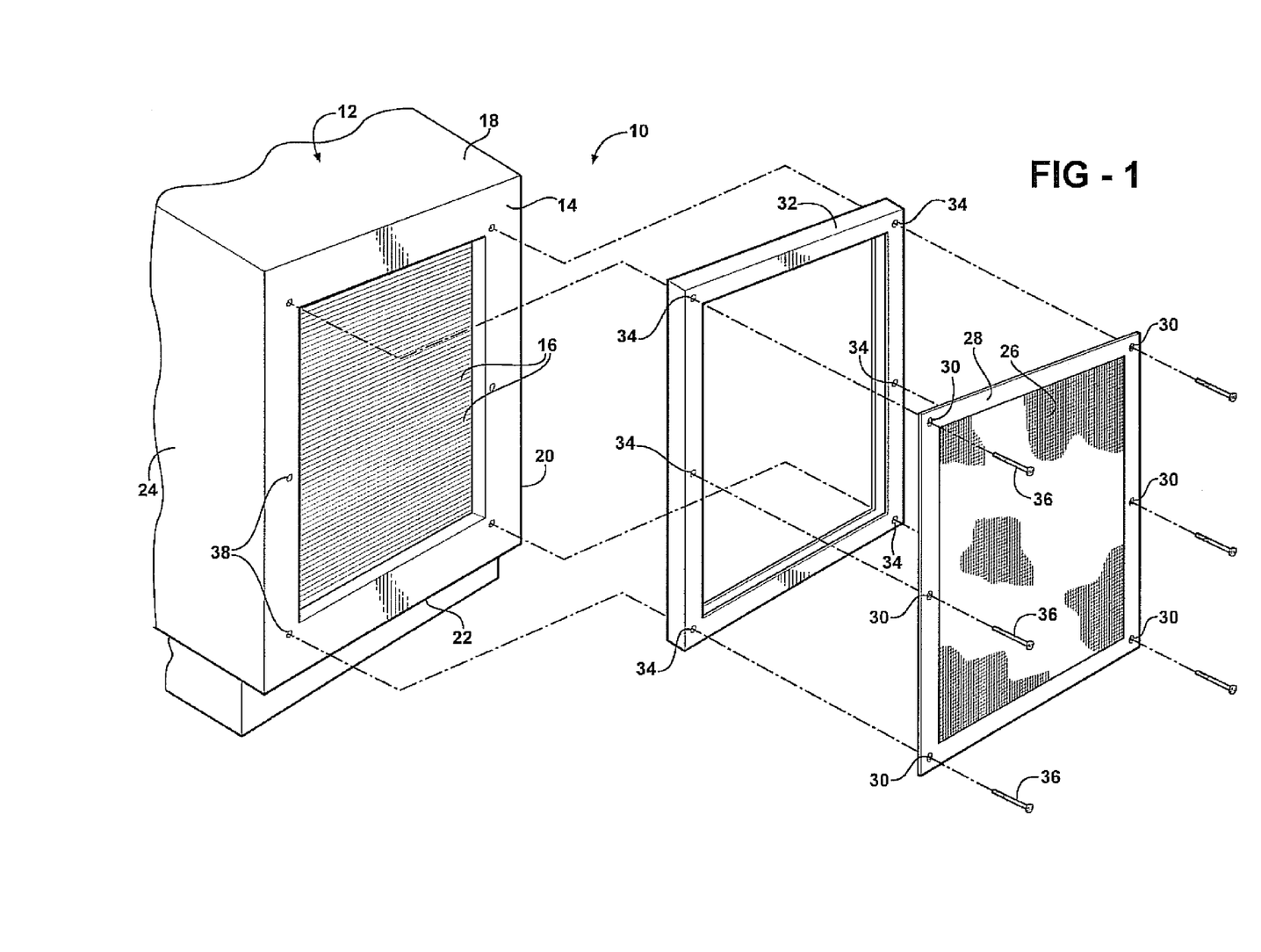
FIG. 1 is an exploded view of the filter screen assembly according to a preferred embodiment of the present invention and illustrating a substantially "U" shaped spacer frame for positioning the filter medium a distance from the surface of the air intake opening.

Referring now to FIG. 1, a filter screen assembly is illustrated generally at 10 in use with an air intake structure 12 according to a first preferred embodiment of the present invention. As previously described, the air intake structure 12 can include such as a cooling tower, HVAC structure, chillers or the like.

In each instance, the intake structure includes a facing surface 14, within which is formed an air intake opening, and which is further illustrated in FIG. 1 by the presence of a plurality of surface extending coils 16. The intake structure 12 is further defined by a plurality of adjoining surfaces 18, 20, 22 and 24 extending at an angle (typically perpendicular) relative to the facing surface 14. It is also envisioned that other shapes and structures of air intake units can be utilized with the filter screen assembly of the present invention.

Referring again to FIG. 1, the filter screen assembly 10 includes a screen 26 constructed of a mesh (typically flexible) material, such as typically including a vinyl coated polyester medium which exhibits the necessary properties of strength and resilience for absorbing impact forces associated with such articles as hail stones and the like. The screen 26 may include a reinforced outer perimeter edge 28 or, alternatively, the mesh material may extend all the way about the screen's outer perimeter.

In a preferred embodiment, as illustrated, the screen 26 exhibits a rectangular, or four-sided, configuration, and with four interconnected perimeter edges. The frame can be provided as one piece or can include a number of end-to-end assembleable pieces, based upon size requirements. It is further understood that an outer configuration exhibiting any number of sides, ranging from a three-sided triangle to a circular-shaped filter (this exhibiting an infinite number of sides) is possible within the scope of the invention.

The outer perimeter edge may further include, without limitation, a reinforced stitching, another material which complements the central mesh screen 26 or, as will be further described, provision of a stiffening or other type of reinforcing portion to provide strength and/or rigidity about the outer periphery of the screen assembly. A plurality of grommets, typically ring shaped metallic disk members, are incorporated into the screen 26 and arranged at locations about a periphery of the screen, and such as within the reinforced outer edging 28. It is also envisioned that the grommets, see at 30 in FIG. 1, can also be formed within the mesh filter material itself and without sacrificing the necessary degree of tear resistance.

Figure 2:
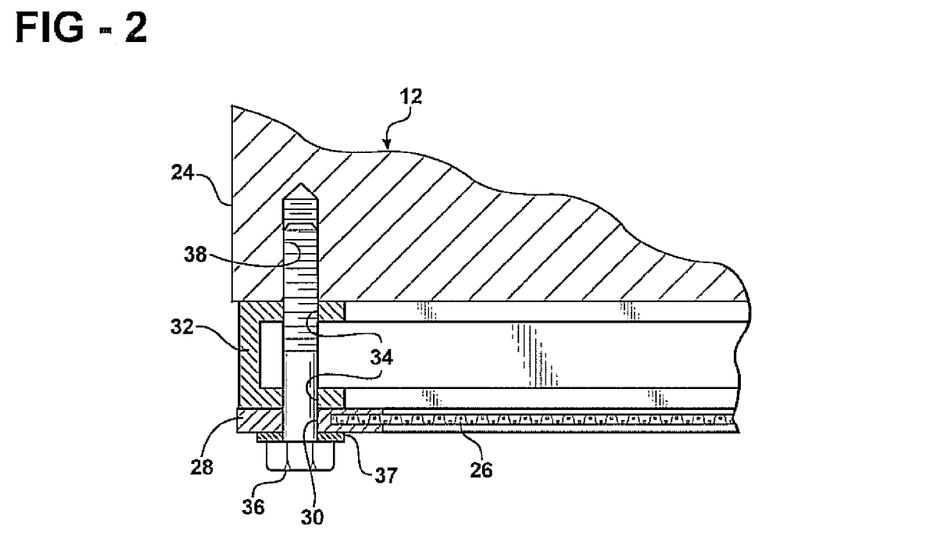
FIG. 2 is an assembled cutaway view of the filter screen assembly illustrated in FIG. 1.

A rectangular (four-sided) stand-off frame is illustrated at 32 and includes, as also shown in the cutaway of FIG. 2, a substantially "U" shaped configuration. A plurality of apertures are formed through the interconnecting sides of the frame 32, see as shown at 34, and at locations corresponding to the arrangement of grommets 30 in the screen 26.

As further shown in FIG. 2, the apertures 34 are formed through both of first and second spaced apart and parallel extending surfaces associated with the "U" shaped channel. In this fashion, a plurality of elongated fasteners 36, such as including surface washers 37, may be secured through the mating locations of the grommets 30, frame apertures 34, and additional aligning apertures 38, typically interiorly threaded, formed in the front face 14 of the air intake structure and in order to space the screen 26 from the surface 14 of the air intake unit, as well as its exposed coils 16.

The screen 26 thereby functions to filter out contaminants associated with an air stream entering the intake structure and to prevent the screen from being drawn into the air intake opening. An additional feature is the ability of the screen to absorb and redirect impact forces associated with hail stones and other articles away from the surface of the air intake unit, and particularly its exposed chiller coils. Damage to the coils results in reduced efficiency, increased energy consumption and reduced life to the equipment.

Figure 3:
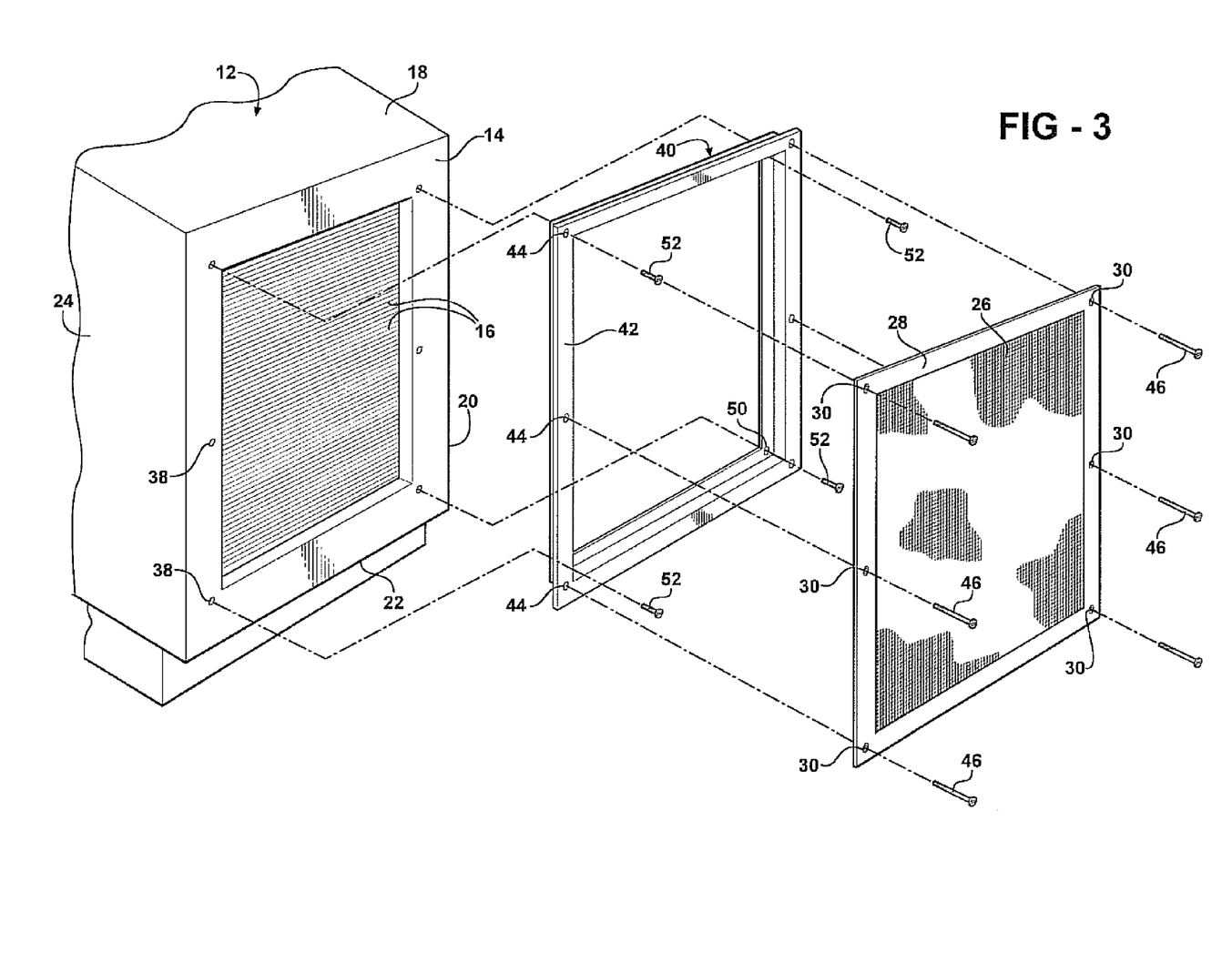
FIG. 3 is a succeeding perspective view of the filter screen assembly according to a further preferred embodiment and illustrating a substantially "S" shaped spacer frame for positioning the filter medium a distance from the surface of the air intake opening.
Figure 4:
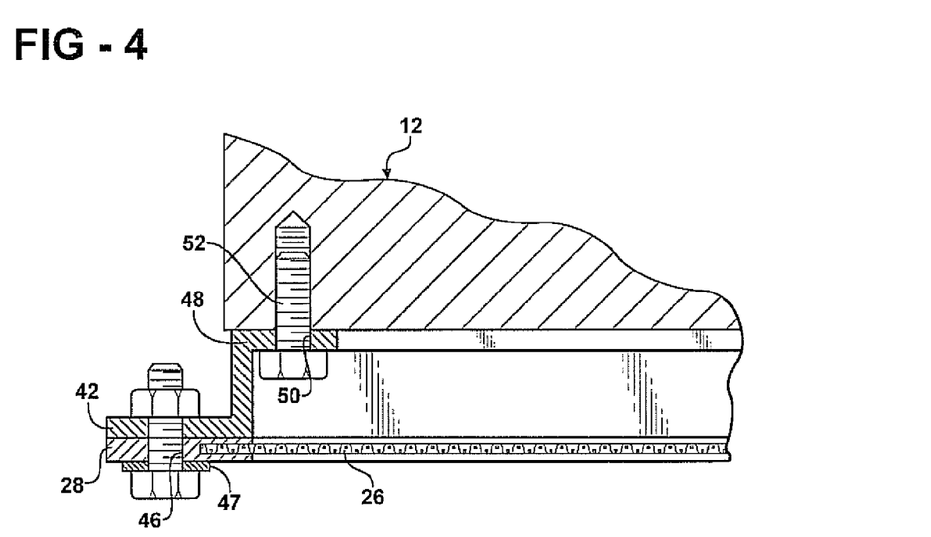
FIG. 4 is an assembled cutaway view of the filter screen assembly illustrated in FIG. 3.

Referring now to the exploded perspective view of FIG. 3, a further preferred variant is illustrated and by which the substantially "U" shaped frame of FIG. 1 is replaced by a rectangular frame 40 exhibiting a substantially modified "S" shaped configuration, see also cutaway view of FIG. 4. In this variant the frame 40 includes an outer and extending surface 42, through which are formed a plurality of apertures 44. The grommets 30 in the screen 26 align with the apertures 44 and receive a first plurality of fasteners, see as representatively shown at 46 in FIG. 3 and with surface washers 47, in order to mount the screen 26 to the outer perimeter surface of the stand-off frame 40.

The frame 40 further includes a spaced and oppositely/inwardly extending surface 48, this likewise including a plurality of apertures 50. A further plurality of fasteners 52 mount the inner surfaces 48 of the modified "S" cross sectional spacer frame to the surface 14 of the air intake unit.

Figure 5:
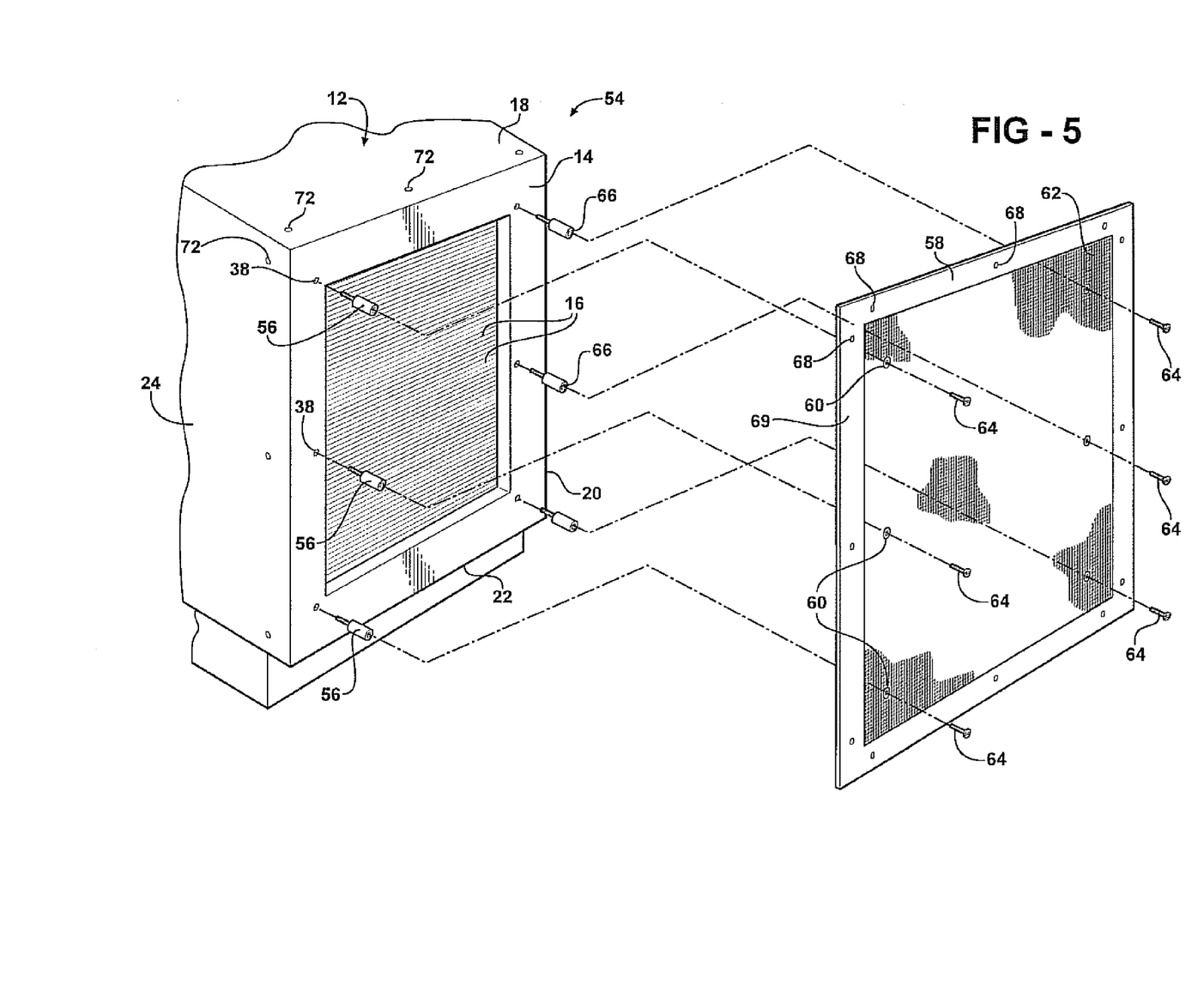
FIG. 5 is an exploded view of the filter screen assembly according to a yet further preferred embodiment of the present invention and which discloses a plurality of spacing collars for positioning the filter medium a distance from the surface of the air intake opening.

FIG. 5 is an exploded view, at 54, of a filter screen assembly according to a yet further preferred embodiment of the present invention, and by which the stand-off frame is substituted by a plurality of sleeve shaped and spacer collars 56 affixed at perimeter spaced locations about the air intake face 14. The sleeve shaped collars 56 are typically constructed of a durable material, such as an aluminum, steel or durable nylon material and include threaded extending portions which engage within the apertures 38.

A screen 58 includes a first plurality of grommets 60 formed at interior and perimeter extending locations associated with the mesh weave material 62. A plurality of fasteners 64 are provided and which engage through the grommets 60 in order to secure the inner perimeter locations of the screen 58 to exposed extending surfaces of the collars 56. Specifically, the collars 56 each include interiorly threaded apertures 66 over which the grommets 60 are aligned and engaged by fasteners 64, and by which the spacing collars position the filter medium a distance from the surface 14 of the air intake opening.

Figures 6, 7:
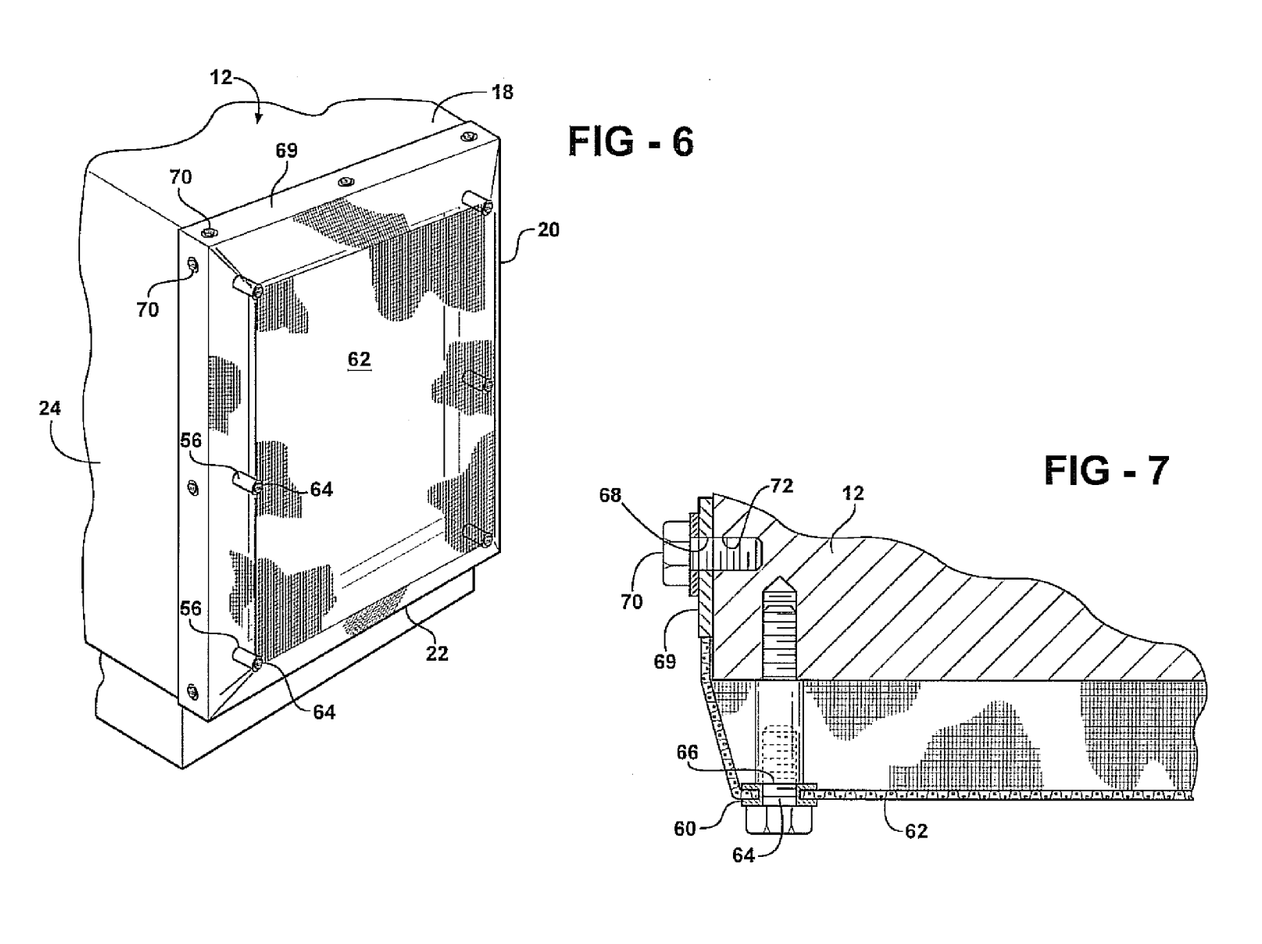
FIG. 6 is an assembled perspective view of the filter screen assembly illustrated in FIG. 5 and showing the wrap-around nature of the filter screen medium securing against to the top, side and bottom angled surfaces of the air intake structure interconnecting with the front facing surface.
FIG. 7 is a sectional corner view of the filter screen assembly illustrated in FIG. 6 and illustrating both front and side engaging locations of mounting fasteners associated with the filter screen.

A second plurality of apertures are defined at outer perimeter extending locations associated with the screen 62, see at 68 in FIGS. 5-7, and which may include either grommets or be provided as circular apertures corresponding to locations formed in an outer reinforced perimeter, see at 69, associated with the screen 62. A second plurality of mounting fasteners are referenced at 70 and which mount through the outer perimeter located grommets/apertures 68 extending along the four sides of the screen 62 and in order to secure the outer locations of the screen in wrap-around fashion against the top, sides and bottom angled surfaces 18-24 of the air intake structure 12 interconnecting with the front facing surface 14. Additional apertures, typically again interiorly threaded, are formed in the sides 18-24 of the air intake structure as shown at 72 and in order to secure the edges of the filter screen 62 in wrap around and adhering fashion as best shown in FIGS. 6 and 7.

An advantage of the variant of FIGS. 5-7 is that it increases the surface area of available filtration, by adding fold-over sides of the screen which are secured against the sides of the air intake unit, while again permitting the extending mesh surfaces of the screen 62 to perform impact absorption and deflection of articles, such as again including hail stones and the like, which would otherwise impact and damage the surface coils 16 associated with the air intake opening.

Having described our invention, other and additional preferred embodiments will become apparent to those skilled in the art to which it pertains and without deviating from the scope of the appended claims. In particular, it is contemplated that additionally and alternately configured fasteners can be employed in place of those illustrated in the drawing illustrations. It is also envisioned that fasteners can be disposed along fewer than all four sides of the screen, such as along at least one of the upper and lower extending perimeter edges, and without departing from the scope of the invention.

I claim:

1. A filter screen assembly for use with an air intake structure, the structure including a face within which is formed an air intake opening and which further exhibits a plurality of exposed coils, said assembly comprising:
   a screen comprising an air permeable material and exhibiting the properties of strength and resiliency in absorbing impact forces associated with articles striking said screen, said screen further having an outer perimeter edge;
   a rectangular shaped stand-off frame secured about a perimeter of the intake structure face surrounding the air intake opening; and
   said perimeter edge of said screen being secured by fasteners to said frame to space said screen from a surface of the air intake structure and to filter out contaminants associated with on air stream entering the intake, said screen absorbing and redirecting the impact forces associated with the striking articles away from the exposed coils associated with the air intake structure.

2. The filter screen assembly as described in claim 1, said stand-off frame further comprising a substantially "U" shape in cross section.

3. The filter screen assembly as described in claim 1, said stand-off frame further comprising a modified "S" shape in cross section.

4. The filter screen assembly as described in claim 1, said screen further comprising a plurality of perimeter located grommets, a plurality of elongated fasteners inserting through said grommets and securing said screen to said stand-off frame.

5. The filter screen assembly as described in claim 2, said screen further comprising a plurality of perimeter located grommets, a plurality of elongated fasteners inserting through said grommets and corresponding apertures formed in said "U" cross sectional shaped frame and the air intake structure.

6. The filter screen assembly as described in claim 3, a first plurality of fasteners securing an inner facing surface of said "S" cross sectional shaped frame to the air intake structure.

7. The filter screen assembly as described in claim 6, said screen further comprising a plurality of perimeter located grommets, a second plurality of fasteners securing said screen to said outer facing surface of said "S" cross sectional shaped frame.

8. The filter screen assembly as described in claim 1, said screen exhibiting a specified shape and size and further comprising a vinyl coated and polyester medium.

9. The filter screen assembly as described in claim 8, said screen further comprising an outer reinforced perimeter including grommets for receiving through fasteners.

10. The filter screen assembly as described in claim 1, said three-dimensional component further comprising a plurality of sleeve shaped spacer collars affixed at perimeter spaced locations about the air intake face.

11. The filter screen assembly as described in claim 10, said screen further comprising a first plurality of grommets formed in said air permeable material at interior locations, a first plurality of fasteners securing said screen to said spacer collars.

12. The filter screen assembly as described in claim 1, further comprising pluralities of said fasteners disposed along at least one of upper and lower extending perimeter edges associated with said screen.

13. A filter screen assembly for use with an air intake structure, the structure including a face within which is formed an air intake opening further exhibiting a plurality of exposed coils, said assembly comprising:
- a screen comprising an air permeable and impact resistant material and having an outer perimeter edge;
- a rectangular shaped stand-off frame secured to about a perimeter of the intake structure face surrounding the air intake opening;
- said screen further comprising a plurality of perimeter located grommets, a plurality of elongated fasteners inserting through said grommets and securing said screen to said stand-off frame; and
- said perimeter edge of said screen being secured by fasteners along a selected number of sides of said rectangular shaped frame to space said screen from a surface of the air intake structure and to filter out contaminants associated with an air stream entering the intake, said screen redirecting impacting articles away from the exposed coils.

14. The filter screen as described in claim 13, said frame further comprising a substantially "U" shape in cross section.

15. The filter screen as described in claim 13, said frame further comprising a modified "S" shape in cross section.

16. A filter screen assembly for use with an air intake structure, the structure including a face within which is formed an air intake opening, said assembly comprising:
- a screen comprising an air permeable material and having an outer perimeter edge, said screen further comprising a first plurality of grommets formed in said air permeable material at interior locations;
- at least one three-dimensional component adapted to being secured about a perimeter of the intake structure face surrounding the air intake opening, said three-dimensional component further comprising a plurality of sleeve shaped spacer collars affixed at perimeter spaced locations about the air intake face, a first plurality of fasteners securing said screen to said spacer collars;
- a second plurality of grommets formed at spaced locations along an outer perimeter of said screen, a second plurality of mounting fasteners securing through said second plurality of grommets to mount said outer perimeter locations of said screen in overlaying and engaging fashion against adjoining surfaces of the intake unit angled relative to the air intake face; and
- said perimeter edge of said screen being secured by fasteners to said three-dimensional component to space said screen from a surface of the air intake structure and to filter out contaminants associated with an air stream entering the intake.

* * * * *